(12) United States Patent
Yamasaki

(10) Patent No.: US 10,509,211 B2
(45) Date of Patent: Dec. 17, 2019

(54) OPTICAL SYSTEM AND IMAGE PICKUP APPARATUS HAVING THE SAME

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 15/830,287

(22) Filed: Dec. 4, 2017

(65) Prior Publication Data
US 2018/0157014 A1 Jun. 7, 2018

(30) Foreign Application Priority Data
Dec. 5, 2016 (JP) .................................. 2016-235779

(51) Int. Cl.
| | |
|---|---|
| G02B 13/18 | (2006.01) |
| G02B 3/08 | (2006.01) |
| G02B 13/06 | (2006.01) |
| G02B 27/00 | (2006.01) |
| G02B 1/04 | (2006.01) |
| H04N 5/225 | (2006.01) |

(52) U.S. Cl.
CPC .............. G02B 13/18 (2013.01); G02B 13/06 (2013.01); G02B 27/0006 (2013.01); G02B 1/041 (2013.01); H04N 5/2254 (2013.01)

(58) Field of Classification Search
CPC .... G02B 13/18; G02B 13/06; G02B 27/0006; G02B 1/041; H04N 5/2254
USPC ........................................................ 359/718
See application file for complete search history.

(56) References Cited

U.S. PATENT DOCUMENTS

2006/0177217 A1\* 8/2006 Opmeer ........... G08B 13/19619
396/427

FOREIGN PATENT DOCUMENTS

| JP | 2011-18009 A | 1/2011 |
| JP | 2012-173330 A | 9/2012 |
| JP | 2015-82068 A | 4/2015 |

\* cited by examiner

Primary Examiner — William Choi
(74) Attorney, Agent, or Firm — Carter, DeLuca & Farrell LLP

(57) ABSTRACT

Provided is an optical system according to the present invention, comprising a protection cover made of resin and a lens portion arranged in order from an object side to an image side, in which the protection cover includes an aspherical surface whose shape changes continuously from an optical axis to a peripheral portion, and where an effective diameter of the aspherical surface is represented as 2×ha, a distance $sag_1$ in a direction of the optical axis between the aspherical surface and a reference spherical surface of the aspherical surface at a position where the height from the optical axis is ha, and a thickness tc of the protection cover on the optical axis are appropriately set.

9 Claims, 6 Drawing Sheets

OPTICAL SYSTEM AND IMAGE PICKUP APPARATUS HAVING THE SAME

BACKGROUND OF THE INVENTION

Field of the Invention

The present invention relates to an optical system having a protection cover on the light incident side, and is suitable for, e.g., an image pickup apparatus such as a surveillance camera or a vehicle-mounted camera.

Description of the Related Art

In recent years, an optical system for a surveillance camera is demanded to have a wide angle of view so that the entire system is compact and in addition, a wide area can be captured with a single camera. As an optical system which is small and can easily increase the angle of view, a negative lead type optical system is known in which a lens unit having a negative refractive power is located closest to the object side (Japanese Patent Application Laid-Open No. 2011-18009 and Japanese Patent Application Laid-Open No. 2015-82068). Japanese Patent Application Laid-Open No. 2011-18009 and Japanese Patent Application Laid-Open No. 2015-82068 disclose a zoom lens comprising a first lens unit having a negative refractive power, an aperture stop, and a second lens unit having a positive refractive power in order from the object side to the image side, in which the first lens unit and the second lens unit move during zooming.

A surveillance camera uses a box type image pickup apparatus designed to protect an image pickup lens, a circuit board, and the like with a housing by covering the front surface of the lens at the object side with a transparent protection cover so that the surveillance camera can perform an image pickup in a preferable manner even under conditions such as rainfall (Japanese Patent Application Laid-Open No. 2012-173330). Japanese Patent Application Laid-Open No. 2012-173330 discloses an image pickup apparatus for surveillance in which a window is provided on the object side of the optical system to protect the internal optical system.

A negative lead type optical system in which a lens unit having negative refractive power is first arranged is relatively easy to achieve a wide angle of view while downsizing the entire system and is suitable as an optical system for surveillance cameras. A configuration for making a box type in which a protection cover for protecting the internal optical system is provided closest to the object side is also suitable for a surveillance camera or the like. In an optical system of a negative lead type in which a protection cover is provided closest to the object side, it is important to appropriately set the lens configuration in order to downsize the entire system with small distortion when widening the angle of view and high optical performance.

For example, in order to reduce the occurrence of distortion when a wide angle of view is increased, it is important to use an aspheric lens and appropriately set the aspheric amount of the aspherical surface. In both of Japanese Patent Application Laid-Open No. 2011-18009 and Japanese Patent Application Laid-Open No. 2015-82068, the zoom lens has a distortion of about 50% at maximum, and the distortion of the image is high in the peripheral part in the image pickup. In order to correct the distortion, it is necessary to increase the number of lenses, which tends to increase the size of the entire system.

SUMMARY OF THE INVENTION

It is an object of the present invention to provide an optical system which can easily obtain high optical performance over the entire zoom range while the optical system is compact as a whole and has a wide angle of view.

The optical system according to the present invention comprises a protection cover made of resin and a lens portion arranged in order from an object side to an image side. The protection cover includes an aspherical surface whose shape changes continuously from an optical axis to a peripheral portion. In the optical system, the following conditional expression is satisfied:

$$0.05 < |sag_1/tc| < 5.00$$

where $2 \times ha$ represents an effective diameter of the aspherical surface, $sag_1$ represents a distance in a direction of the optical axis between the aspherical surface and a reference spherical surface of the aspherical surface at a position where the height from the optical axis is ha, and tc represents a thickness of the protection cover on the optical axis.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An optical system and an image pickup apparatus having the same according to the present invention will be described below. The optical system according to the present invention has a protection cover and a lens portion arranged in order from the object side to the image side. The protection cover consists of a single optical element (lens) made of resin, and at least one optical surface (lens surface) of the protection cover is an aspherical surface which continuously changes in shape from the optical axis (the lens surface apex) to the peripheral part.

The optical system used for the image pickup apparatus according to the present invention has a protection cover and a lens portion, and distortion is corrected well while achieving a wide angle of view with the entire system being small. The protection cover protects the lens portion and corrects the distortion.

Figure 1A:
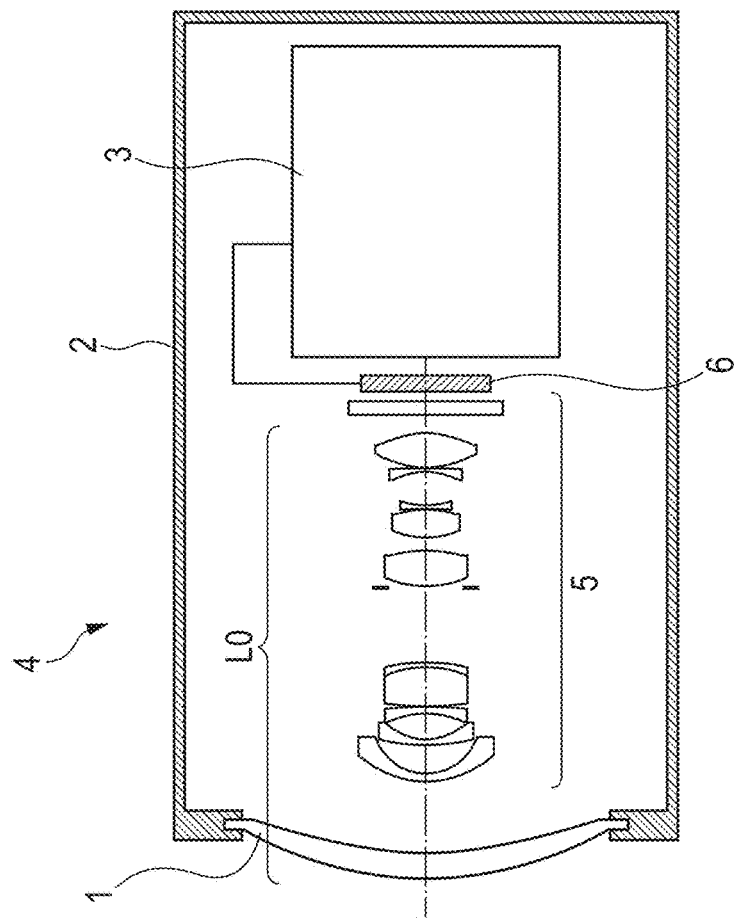
FIG. 1A is a cross-sectional view illustrating a main part of an image pickup apparatus according to the present invention.
Figure 1B:
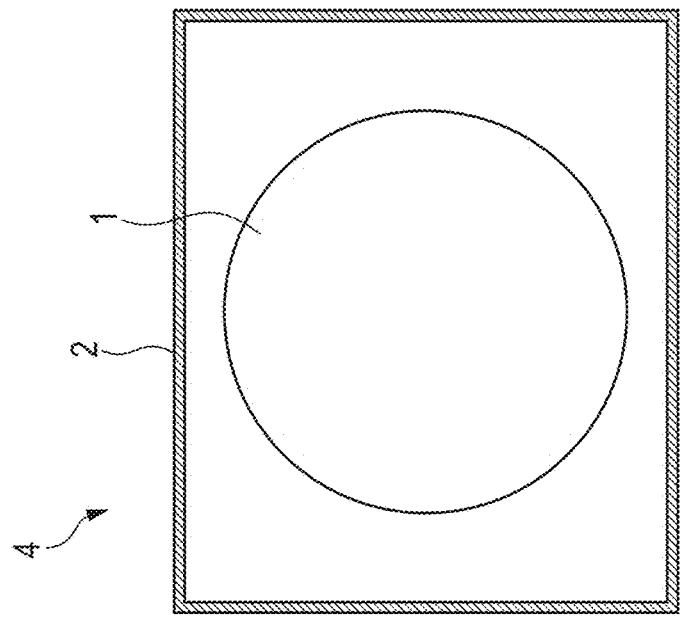
FIG. 1B is a front view illustrating a main part of the image pickup apparatus according to the present invention.

FIGS. 1A and 1B are a cross-sectional view illustrating a main part of the image pickup apparatus according to the present invention and a front view illustrating a main part of the image pickup apparatus according to the present invention, respectively. In FIGS. 1A and 1B, reference numeral 4 denotes an image pickup apparatus, L0 denotes an optical system, and a protection cover 1 and a lens portion 5 are provided. Reference numeral 2 denotes a housing, in which the optical system L0, image pickup element 6, the signal processing unit 3, and the like are accommodated therein. An object image is formed on an image pickup element (solid-state image pickup element) 6 by a light flux passing through an optical system including the protection cover 1 and the lens portion 5. The signal related to the object image photoelectrically converted by the image pickup element 6 is image processed by the signal processing unit 3.

Figure 2:
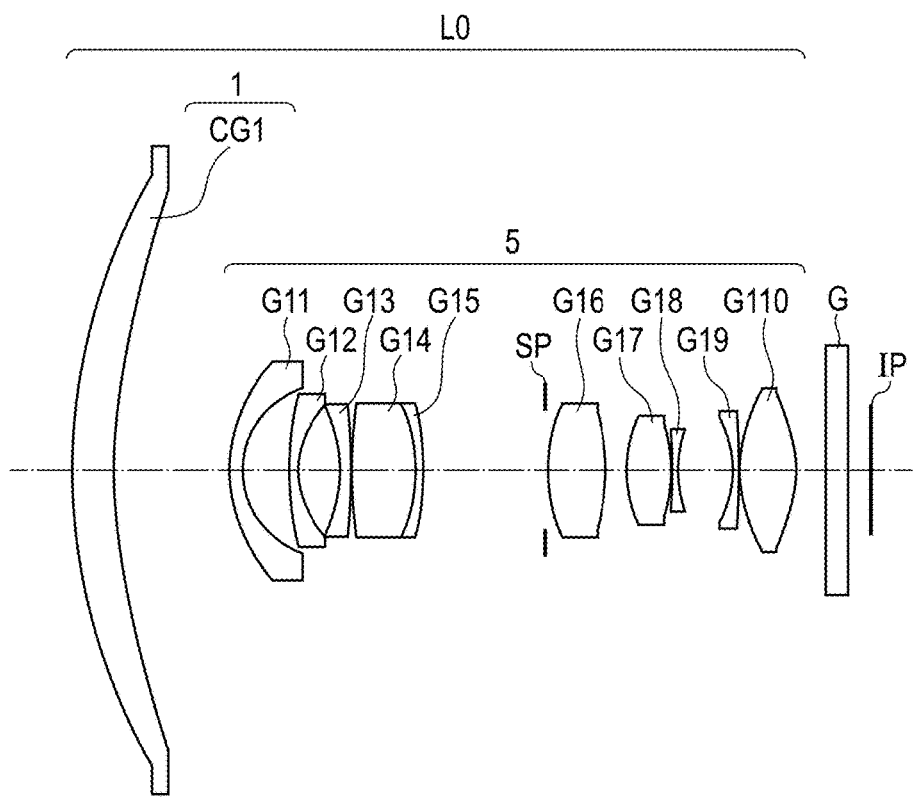
FIG. 2 is a cross-sectional view illustrating lenses in a first embodiment of an optical system according to the present invention.
Figure 3:
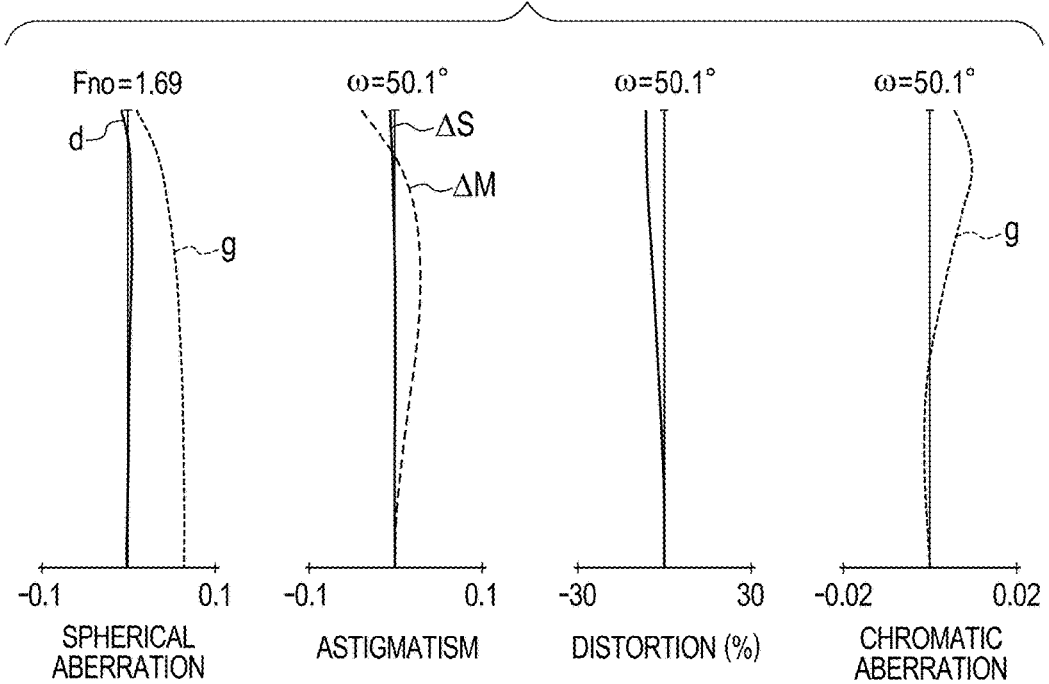
FIG. 3 is various aberration diagrams of the first embodiment of the optical system according to the present invention.
Figure 4A:
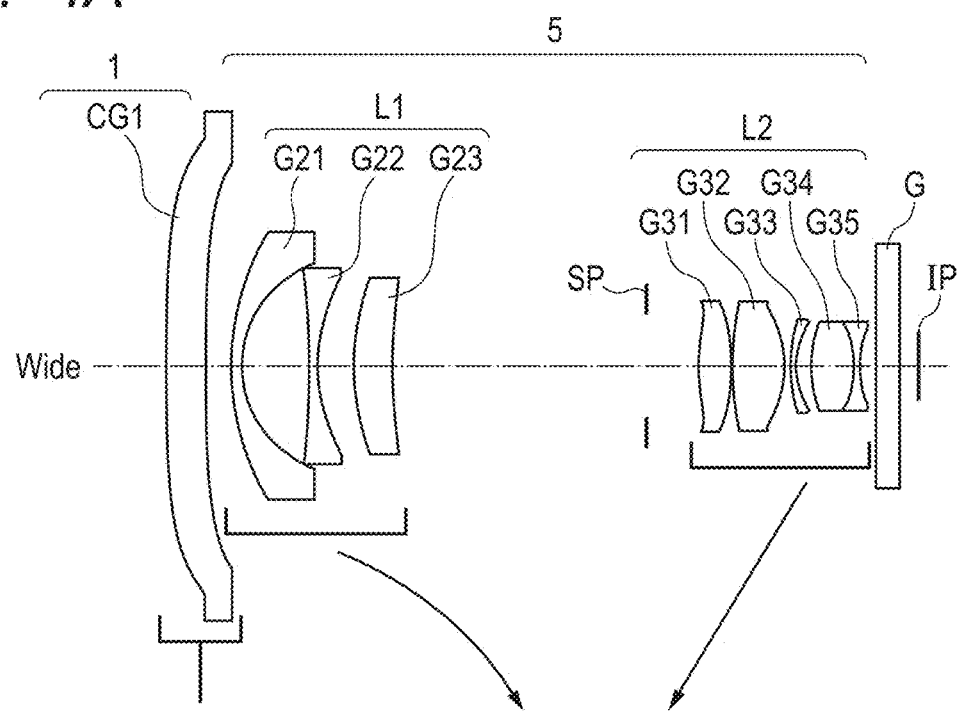
FIG. 4A is a lens cross-sectional view at the wide angle end of a second embodiment of an optical system according to the present invention.
Figure 4B:
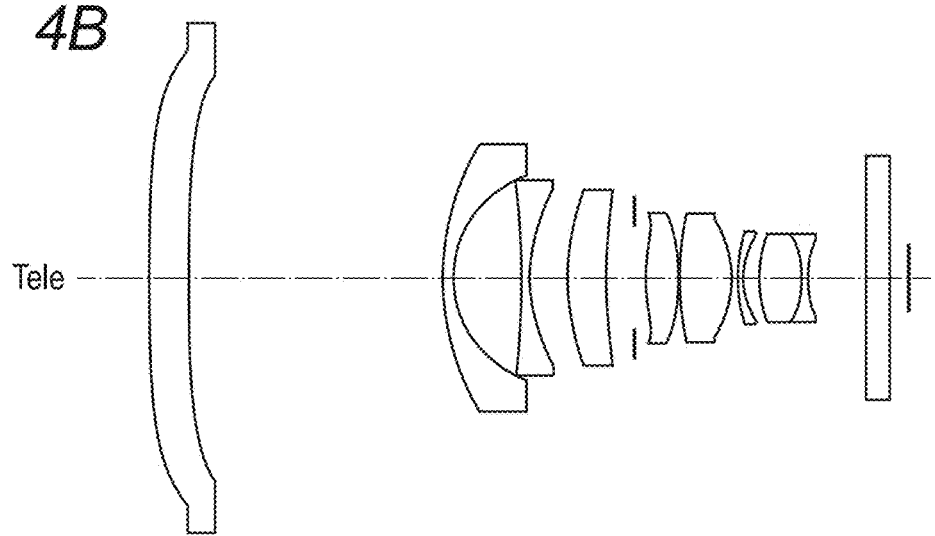
FIG. 4B is a lens cross-sectional view at the telephoto end of the second embodiment of the optical system according to the present invention.
Figure 5A:
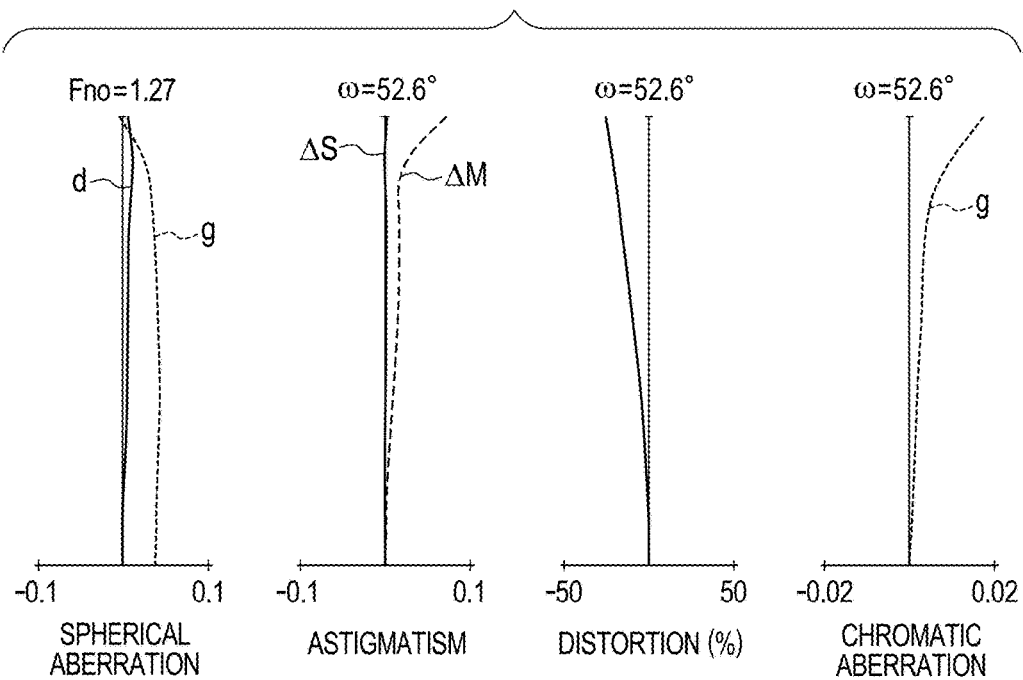
FIG. 5A is various aberration diagrams at the wide angle end of the second embodiment of the optical system according to the present invention.
Figure 5B:
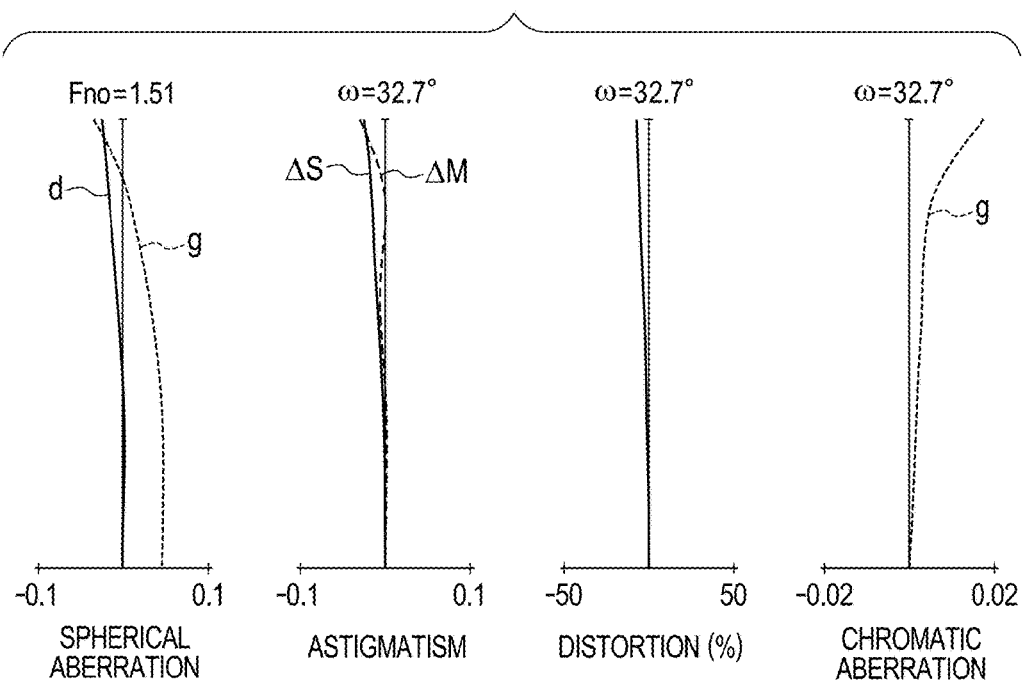
FIG. 5B is various aberration diagrams at an intermediate zoom position of the second embodiment of the optical system according to the present invention.
Figure 5C:
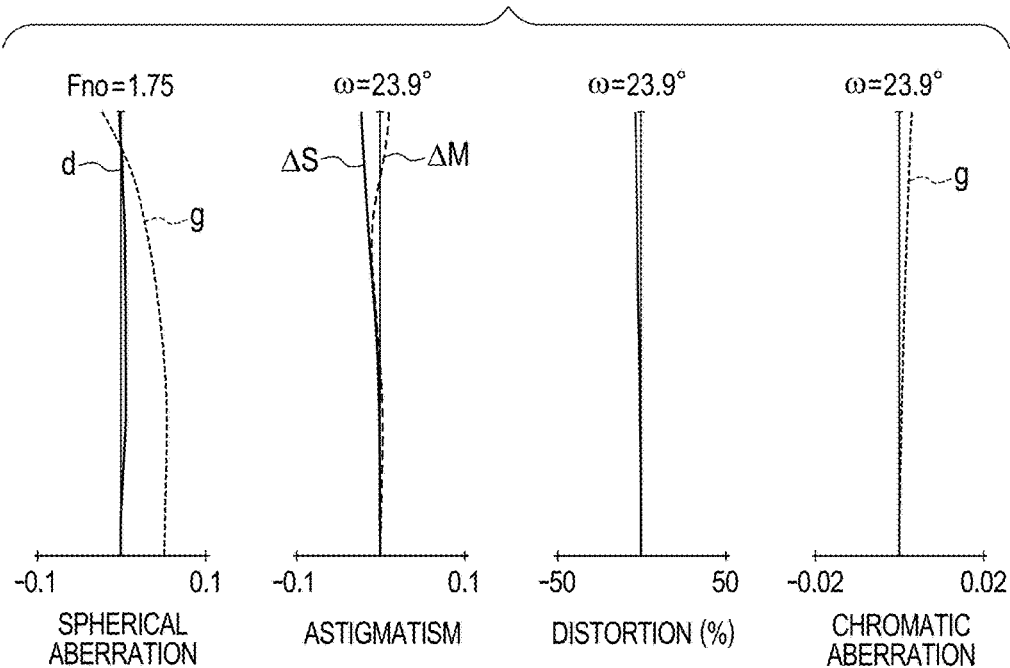
FIG. 5C is various aberration diagrams at the telephoto end of the second embodiment of the optical system according to the present invention.
Figure 6:
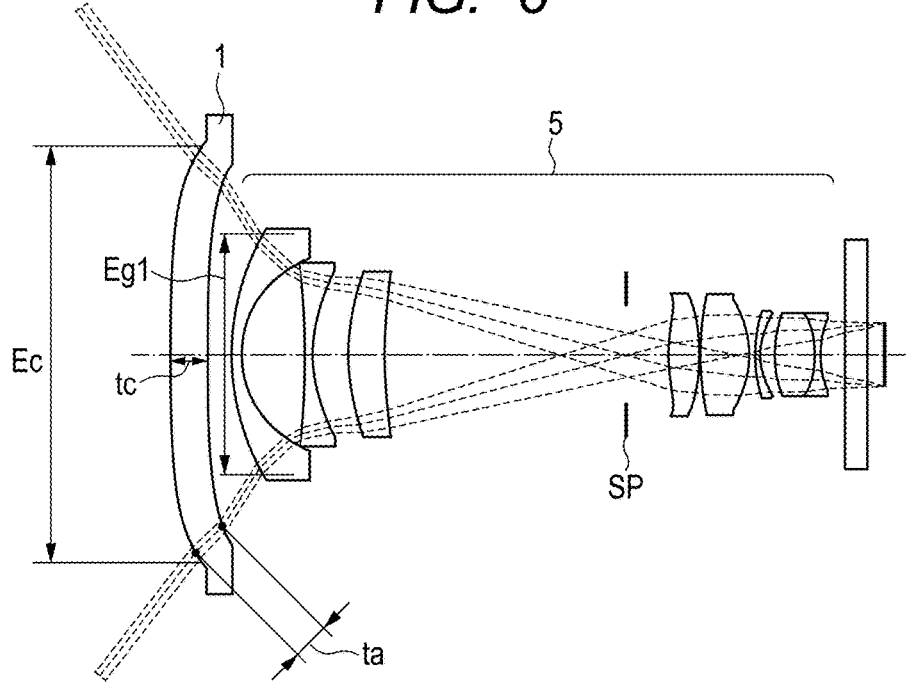
FIG. 6 is an explanatory view illustrating light flux incident on the maximum image height of the second embodiment of the optical system according to the present invention.
Figure 7:
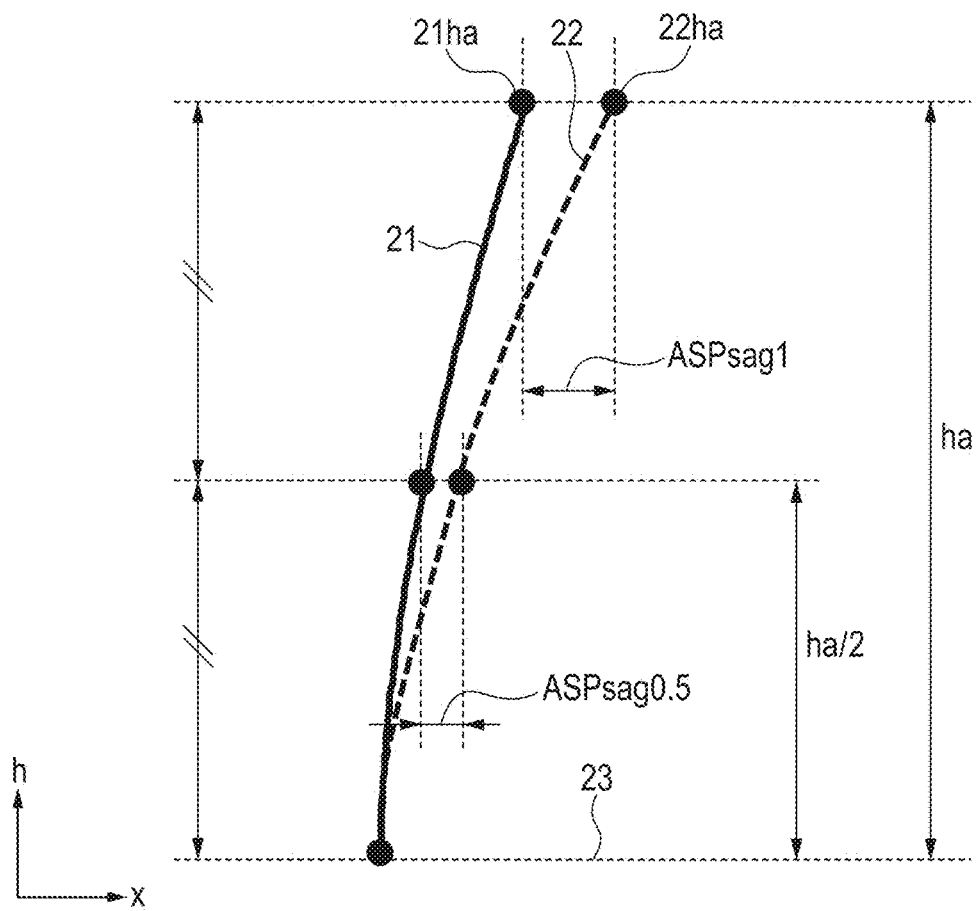
FIG. 7 is an explanatory diagram illustrating the aspheric amount of the aspherical shape according to the present invention.
Figure 8:
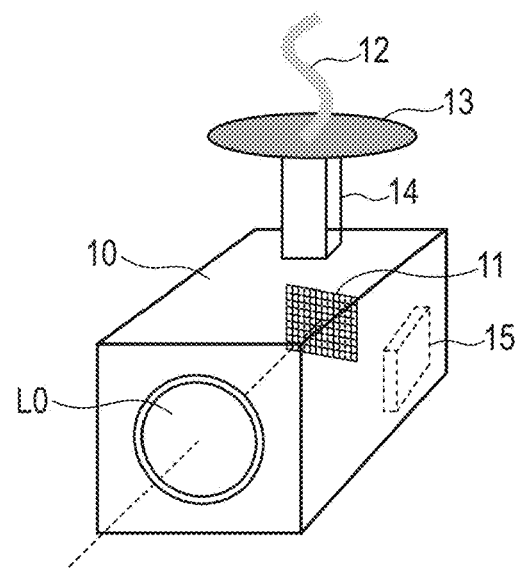
FIG. 8 is a schematic diagram illustrating a main part of the image pickup apparatus according to the present embodiment.

FIG. 2 is a lens cross-sectional view illustrating the first embodiment of the optical system according to the present invention. FIG. 3 is various aberration diagrams illustrating the first embodiment of the optical system according to the present invention. FIGS. 4A and 4B are lens cross-sectional views at the wide angle end and the telephoto end of the second embodiment of the optical system according to the present invention, respectively. FIGS. 5A, 5B, and 5C are various aberration diagrams at the wide angle end, the intermediate zoom position, and the telephoto end of the second embodiment of the optical system according to the present invention, respectively. The optical system according to the second embodiment is formed by a zoom lens. FIG. 6 is an explanatory view illustrating the light flux incident on the maximum image height in the optical system according to the present invention. FIG. 7 is an explanatory diagram illustrating the aspherical amount of the aspherical shape according to the present invention. FIG. 8 is a schematic diagram illustrating a main part of the image pickup apparatus according to the present invention.

The optical system L0 according to the present invention includes the protection cover 1 and the lens portion 5. At least one lens surface of the protection cover 1 is formed into an aspherical shape to effectively correct the distortion. As one means that realizes wide angle of view of the optical system, there is means that ensures the imaging angle of view by allowing distortion, and what is commonly called a fisheye lens corresponds thereto. This is because, in light of alleviating the load for correcting the distortion, the effective diameter of the lens and the number of lenses constituting the optical system can be reduced, so that this is advantageous for reducing the size of the entire system.

On the other hand, when a system having a wide angle of view is adopted, a large amount of negative distortion occurs, and negative distortion remains. In particular, as the image height increases, more distortion remains. For this reason, the image is compressed in the periphery. For example, if much distortion remains in the optical system, a phenomenon occurs in which the straight line becomes a curved line and the circle becomes a distorted ellipse in the captured image, and as this influence becomes more significant, it becomes difficult to accurately recognize the subject.

On the other hand, in surveillance cameras, a box type image pickup apparatus in which a protection cover is arranged on the front of the lens is often used. This is to protect the lens and internal components so that it can operate normally as an image pickup apparatus even under environments exposed to attacks and rain from the outside. Plastic (resin material) is used for this protection cover in consideration of aggressiveness, and in many cases, both lens surfaces are planar (curvature radius is ∞).

In view of such problems of distortion, the optical system according to the present invention effectively utilizes the box-type configuration having a protection cover to correct the distortion well while reducing the size of the entire system. More specifically, while the protection cover is set as a part of the lens configuration of the optical system, at least one surface of the protection cover is given an aspheric effect to correct the distortion in a preferable manner.

The image pickup apparatus according to the present invention includes the image pickup element 6 for receiving light of the image formed by the protection cover 1 and the lens portion 5. The image pickup element 6 is, for example, a CCD (Charge Coupled Device) or a CMOS (Complementary Metal Oxide Semiconductor) sensor, and the like.

When the effective diameter of the lens surface in the aspheric shape of the protection cover 1 is represented by 2×ha, the distance between the lens surface in the aspheric shape at the height ha from the optical axis and the reference spherical surface of the lens surface in the aspheric shape in the optical axis direction is denoted as $sag_1$. The thickness on the optical axis of the protection cover 1 is denoted as tc. In this condition, the following conditional expression is satisfied.

$$0.05 < |sag_1/tc| < 5.00 \quad (1)$$

In conditional expression (1), $sag_1$ is the sag amount.

FIG. 7 is an explanatory diagram illustrating the sag amount of the aspherical surface. In FIG. 7, the effective diameter of the aspherical surface 21 is set to 2×ha. The sag amount $sag_1$ corresponds to the difference amount in the optical axis direction between the position 22ha of the curved surface (reference spherical surface) 22 with the paraxial curvature and the position 21ha of the curved surface (aspherical surface) 21 in aspheric shape at the height ha from the optical axis 23.

$sag_{0.5}$ is the difference amount between the aspherical surface 21 and the reference spherical surface 22 at ha/2 where the height from the optical axis at the aspherical surface with the maximum effective ray diameter of 2×ha is 50% of the maximum height ha. With respect to the deviation direction of the aspherical surface 21 from the reference spherical surface 22, the direction in which the medium is added is defined as a positive aspheric amount and the direction in which the medium is abraded is defined as a negative aspherical amount with respect to the reference spherical surface 22. The aspheric amount of the aspherical surface 21 shown in FIG. 7 is positive.

In general, a wide-angle lens adopts a so-called negative lead in which a lens unit having a negative refractive power is first arranged so as to correct various aberrations while widening the angle of view. However, as the angle of view increases, more distortion is likely to occur, and as distortion often occurs in the minus direction in the aberration diagram, distortion of the barrel shape tendency occurs. The distortion tends to increase as the image height increases (when the imaging angle of view is larger). Therefore, as a correction method of distortion, it is preferable to perform correction at a position where the peripheral light flux is away from the optical axis as much as possible.

In the present invention, distortion is corrected by the protection cover 1 installed at the most object side, and at least one surface of the protection cover 1 is formed in aspheric shape. By appropriately setting the aspheric amount of this aspheric shape, distortion aberration is corrected well.

The conditional expression (1) defines the displacement amount from the reference spherical surface of the aspherical surface, and defines a numerical range mainly for correcting the distortion. If the value exceeds the upper limit in the conditional expression (1), the correction of the distortion occurring at the minus side in the optical system L0 becomes excessive, and the distortion increases toward the plus side as a whole, which is not preferable. If the value falls below the lower limit in the conditional expression (1), the effect of correcting the distortion is reduced, which is not preferable. It is preferable that the protection cover 1 is not glass that is easy to break from the viewpoint of resistance, but is plastic material such as PMMA or PC.

According to the present invention, with the above configuration, the protection cover 1 has an aspheric shape suitable for correction of the distortion, thereby correcting the distortion in a preferable manner. The outer shape of the protection cover may be arbitrarily determined as long as the outer shape of the protection cover does not interfere with the effective diameter of ray received by the image pickup element, such as not only a circle but also a square shape or a shape obtained by partially cutting a circle.

The optical system which is the object of the present invention is realized by satisfying the above configuration. Furthermore, it is more preferable to satisfy one or more of the following conditions.

The focal length of the protection cover 1 is denoted as fc. The focal length of the lens portion 5 (i.e., the focal length of the lens portion 5 at the wide angle end when the optical system L0 is a zoom lens) is denoted as fa. The effective diameter of the protection cover 1 is denoted as Ec. The effective diameter of the lens surface at the most object side of the lens portion 5 is denoted as $Eg_1$. The paraxial curvature radiuses of the lens surface at the object side and the lens surface at the image side of the protection cover 1 are denoted as $cr_1$ and $cr_2$, respectively. The distance in the optical axis direction between the lens surface in the aspheric shape at the height ha/2 from the optical axis of the lens surface in the aspheric shape of the protection cover 1 and the reference spherical surface of the lens surface in the aspheric shape is denoted as $sag_{0.5}$.

In the image pickup apparatus comprising the optical system L0 and the image pickup element for receiving light of the image formed by the optical system L0, the optical path length is denoted as ta when the principal ray incident on a position farthest from the optical axis in the imaging plane of the image pickup element passes through the protection cover 1.

At this time, it is preferable that one or more of the following conditional expressions is satisfied.

$$0.00 < |fa/fc| < 0.25 \quad (2)$$

$$1.0 < Ec/Eg_1 < 5.0 \quad (3)$$

$$0.4 < tc/fa < 4.0 \quad (4)$$

$$-2.0 < (cr_1 - cr_2)/(cr_1 + cr_2) < 1.5 \quad (5)$$

$$4.0 < |sag_1/sag_{0.5}| < 80.0 \quad (6)$$

$$0.2 < tc/ta < 1.5 \quad (7)$$

The conditional expression (2) defines the focal length (optical power) of the protection cover 1. As compared to the focal length of the lens portion 5, the focal length of the protection cover 1 is set to increase within a certain range. This is because resin-based material is more susceptible to the influence of a change in the refractive index depending on the temperature than the glass.

When the value exceeds the upper limit in the conditional expression (2), the focal length of the protection cover 1 is shortened (the refractive power itself is increased), so that the focal length greatly changes due to the change in the refractive index caused by the change in the temperature. As a result, a defocus increases, and the resolution is lowered, which is not desired. The lower limit value of the conditional expression (2) is set to 0.00, which means that the focal length of the protection cover 1 is ∞, and the distortion may be corrected by setting the sag amount as the aspheric shape.

The conditional expression (3) defines the relationship between the ray effective diameters of the protection cover 1 and the lens portion 5. For example, as indicated in Yoshiya MATSUI, "Lens Design Method", KYORITSU SHUPPAN CO., LTD., page 87, the third order distortion coefficient V is proportional to the cube of the paraxial height of the principal ray. Therefore, in order to effectively correct the distortion, the correction is preferably made at the position where the distance between the on-axis and off-axis light fluxes is as large as possible on the protection cover 1.

As illustrated in FIG. 6, the parameters Ec, $Eg_1$ of the conditional expression (3) are as follows: the effective diameter Ec denotes the ray effective diameter (condensed at the maximum image height) of the protection cover 1, and the effective diameter $Eg_1$ denotes the ray maximum effective diameter of the lens located closest to the object side of the lens portion 5. When the effective diameter of the protection cover 1 increases to exceed the upper limit of the conditional expression (3), it is difficult to reduce the size of the image pickup apparatus. When the effective diameter of the protection cover 1 decreases to fall below the lower limit of conditional expression (3), it is difficult to correct the distortion, which is not preferable.

The conditional expression (4) relates to the thickness of the protection cover 1 (the thickness on the optical axis). When the thickness of the protection cover 1 becomes too large to exceed the upper limit of the conditional expression (4), it is difficult to reduce the size of the optical system L0. When the thickness of the protection cover 1 becomes too small to fall below the lower limit of the conditional expression (4), the protection cover 1 is difficult to achieve the role as a protection cover such as rigidity and the like, which is not preferable.

The conditional expression (5) relates to the outer shape of the protection cover 1, and is mainly for correcting the distortion in a favorable manner. When the value exceeds the upper limit in the conditional expression (5), the outer shape of the protection cover 1 may be a meniscus shape having a strong curvature of the surface at the image side which is convex toward the object side or a biconcave shape having a strong curvature of the surface at the image side. Then, more distortion occurs, or the correction amount becomes excessive, which is not preferable. When the value falls below the lower limit of the conditional expression (5), the outer shape of the protection cover 1 may be a biconcave shape having a strong curvature (a small curvature radius) of the surface at the object side or a biconvex shape having a strong curvature of the surface at the object side. Then, more distortion occurs, or the correction amount becomes excessive, which is not good.

The conditional expression (6) defines the aspheric amount of aspheric shape in the protection cover 1. The distance $sag_{0.5}$ of the conditional expression (6) relates to the difference in the optical axis direction between the curved surface 22 based on only the paraxial curvature from the optical axis 23 and the actual curved surface (aspherical surface) 21 also including the aspheric shape, and the sag amount at the height ha/2 which is ½ of the ray maximum effective diameter (height ha).

In general, the distortion increases as the image height increases, so it is necessary to balance the correction effect at the light flux passing position according to the image height of the protection cover 1. In this case, as the distance (height) from the optical axis 23 of the protection cover 1 increases, the amount of correction (sag amount) for the aspherical surface is made to be larger. The conditional expression (6) defines the relationship between the displacement amount (sag amount) at the position of the effective diameter of the outermost light flux and that at the position of ½ of the effective diameter of the outermost light flux.

When the value exceeds the upper limit in the conditional expression (6), the displacement amount (sag amount) of the aspherical surface at the maximum image height becomes too large, which is not preferable because a sudden change in the distortion occurs with respect to correction with the aspherical surface. When the value falls below the lower limit of the conditional expression (6), the correction amount of the distortion in the peripheral portion is insufficient, which is not preferable. As illustrated in FIG. 6, the optical path length ta relates to the optical path within the protection cover 1 of the principal ray of the off-axis light flux incident on a position farthest from the optical axis of the imaging surface of the image pickup element (maximum image height). In this case, the principal ray is a ray passing through the center of the aperture stop SP.

The conditional expression (7) defines the condition concerning the thickness on the optical axis of the protection cover 1 and the optical path length (thickness) of off-axis light flux. Since the protection cover 1 is made of resin, it is necessary to consider the conditions of the formability and the rigidity for the purpose of protection against attacks. When the value exceeds the upper limit in the conditional expression (7), the thickness at the peripheral portion is reduced and the fixing strength of the protection cover 1 to the housing is lowered, so that the rigidity is lowered. When the value falls below the lower limit in the conditional expression (7), the rigidity as the protection cover 1 decreases because the thickness at the center of the protection cover 1 decreases.

More preferably, the numerical ranges of the conditional expressions (1) to (7) are set as follows.

$$0.10 < |sag_1/tc| < 3.0 \tag{1a}$$

$$0.001 < |fa/fc| < 0.15 \tag{2a}$$

$$1.4 < Ec/Eg_1 < 4.0 \tag{3a}$$

$$0.5 < tc/fa < 2.9 \tag{4a}$$

$$-1.5 < (cr_1 - cr_2)/(cr_1 + cr_2) < 1.0 \tag{5a}$$

$$8.0 < |sag_1/sag_{0.5}| < 50.0 \tag{6a}$$

$$0.3 < tc/ta < 1.4 \tag{7a}$$

More preferably, the numerical ranges of the conditional expressions (1a) to (7a) are set as follows.

$$0.25 < |sag_1/tc| < 2.00 \tag{1b}$$

$$0.0015 < |fa/fc| < 0.1000 \tag{2b}$$

$$1.5 < Ec/Eg_1 < 3.0 \tag{3b}$$

$$0.6 < tc/fa < 2.0 \tag{4b}$$

$$-1.0 < (cr_1 - cr_2)/(cr_1 + cr_2) < 0.5 \tag{5b}$$

$$9.0 < |sag_1/sag_{0.5}| < 35.0 \tag{6b}$$

$$0.4 < tc/ta < 1.3 \tag{7b}$$

Hereinafter, the optical system according to each embodiment will be described. FIG. 2 is a schematic view illustrating a main part of the first embodiment of the optical system according to the present invention. In FIG. 2, reference numeral L0 denotes an optical system. In FIG. 2, reference numeral 1 denotes a protection cover. Reference numeral 5 denotes a lens portion having a single focal length. The protection cover 1 consists of an aspheric lens CG1 having a lens surface in an aspheric shape with a convex surface facing the object side. By adopting an aspherical surface, the distortion is effectively corrected. The aspheric lens CG1 is configured so that the lens portion 5 does not directly contact with the external environment inside of the housing 2 of the image pickup apparatus 4 to serve as a lens for protection cover.

The lens portion 5 is configured as a lens with a single focal length including lenses G11 to G110. G is a glass block such as a face plate. IP is an image plane, and the imaging plane of the image pickup element is located at the image plane IP. High optical performance is obtained by appropriately setting the shape, arrangement, and glass material of each lens.

FIGS. 4A and 4B are lens cross-sectional views at the wide angle end and telephoto end of the second embodiment of the optical system L0 according to the present invention, respectively. In FIGS. 4A and 4B, reference symbol 1 denotes a protection cover. The lens portion 5 according to the second embodiment is a zoom lens. The protection cover 1 consists of an aspheric lens CG1 having a lens surface in an aspheric shape with a convex surface facing the object side. The lens portion 5 includes a first lens unit L1 having a negative refractive power and a second lens unit L2 having a positive refractive power arranged in order from the object side to the image side. During zooming from the wide angle end to the telephoto end, the first lens unit L1 moves to the image side and the second lens unit L2 moves to the object side as indicated by the arrows. G denotes a glass block such as a face plate.

IP is the image plane, and the imaging plane of the image pickup element is located at the image plane IP. The first lens unit L1 includes three lenses from the lens G21 to the lens G23. The second lens unit L2 includes five lenses from the lens G31 to the lens G35.

The lens portion 5 according to the present embodiment is a two unit zoom lens in which the first lens unit L1 has a negative refractive power and the second lens unit L2 has a positive refractive power, but the lens portion 5 according to the present embodiment is not limited to thereto, the lens portion 5 according to the present embodiment may be formed by a zoom lens in which the number of lens units and movement conditions during zooming are appropriately set.

Subsequently, an embodiment in which the image pickup apparatus according to the present invention is applied to a surveillance camera will be described with reference to FIG. 8. In FIG. 8, reference numeral 10 denotes a box type surveillance camera. L0 denotes an optical system. Reference numeral 11 denotes an image pickup element incorporated in the surveillance camera 10 and receiving light of a subject image (object image) formed by the optical system L0.

Reference numeral 12 denotes a network cable for transferring a signal relating to a subject image photoelectrically converted by the image pickup element 11, and reference numeral 13 denotes a mounting plate for holding the surveillance camera 10 on a ceiling, a pole or the like. Reference numeral 14 denotes a camera holding arm for holding the surveillance camera 10. Reference numeral 15 denotes a memory unit for recording information (signal) corresponding to the subject image photoelectrically converted by the image pickup element 11.

As described above, according to the respective embodiments, it is possible to obtain the image pickup apparatus having the optical system L0 in which the distortion is corrected in a preferable manner while realizing the wide angle of view while the size of the entire system is kept small.

The protection cover 1 in each embodiment is molded with a plastic material such as polymethyl methacrylate (PMMA) or polycarbonate (PC) with a thickness of about several millimeters.

In each of the embodiments, the following configuration may be adopted.

Employing multi-layer coating on the light input and output surfaces to reduce the reflectance of the light input and output surfaces of the protection cover 1.

Employing hydrophilic coat to prevent adhesion of water droplets and the like on the light input and output surfaces of the protection cover 1.

Employing a wavelength selection coat to cut light flux of a specific wavelength on the light input and output surfaces of the protection cover 1.

Employing a zoom lens having a plurality of lens units as the lens portion 5.

Correcting the distortion, chromatic aberration, and the like generated from the optical system using an electrical correction means.

Although the preferred embodiments of the present invention have been described above, the present invention is not limited to these embodiments and optical specifications, and various modifications can be made within the scope of the gist of the present invention.

Subsequently, numerical value data of each embodiment of the present invention will be shown. In each numerical value data, i denotes the order of surface from the object side. In the numerical value data, ri is the curvature radius of the i-th lens surface in order from the object side. di is the lens thickness and the air interval between the i-th lens surface and the (i+1)-th lens surface in order from the object side. ndi and vdi are the refractive index and the Abbe number, respectively, of the material between the i-th lens surface and the (i+1)-th lens surface in order from the object side with respect to the d-line. The X axis is taken in the direction of the optical axis. The H axis is taken in the direction perpendicular to the optical axis. The direction from the object side to the image side is positive. Let r be the paraxial curvature radius. Let K be the conic constant. Let A4, A6, A8, A10, A12 be aspheric coefficients. In this case, the aspheric shape is expressed by the following expression.

$$X = \frac{(1/R)H^2}{1 + \sqrt{1 - (1+K)(H/R)^2}} + A4 \times H^4 + A6 \times H^6 + A8 \times H^8 + A10 \times H^{10} + A12 \times H^{12}$$

[e+X] means [×10$^{+x}$]. [e$^{-}$X] means [×10$^{-x}$]. BF is the air-equivalent distance (back focus) from the last lens surface to the paraxial image plane. The total lens length is obtained by adding the back focus BF to the distance from the forefront lens surface to the final lens surface. An aspherical surface is indicated by adding "*" to the surface number. Incidentally, each numerical data shows the protection cover 1 as one unit. Table 1 and Table 2 show the relationship between each conditional expression and numerical values in numerical value data.

[Numerical Value Data 1]

| Surface number | r | d | nd | vd | Effective diameter |
|---|---|---|---|---|---|
| 1 | 50.000 | 3.50 | 1.58306 | 30.2 | 49.13 |
| 2* | 46.500 | 10.0 | | | 46.48 |
| 3 | 14.169 | 1.00 | 2.00100 | 29.1 | 17.37 |
| 4 | 7.333 | 4.06 | | | 12.98 |
| 5 | 26.246 | 0.75 | 1.85150 | 40.8 | 11.88 |
| 6 | 7.828 | 3.59 | | | 10.15 |
| 7 | −11.630 | 0.90 | 1.59522 | 67.7 | 9.96 |
| 8 | −73.349 | 0.15 | | | 10.26 |
| 9 | 47.580 | 5.50 | 1.90366 | 31.3 | 10.36 |
| 10 | −13.329 | 0.60 | 1.69680 | 55.5 | 10.31 |
| 11 | −25.535 | 10.53 | | | 10.18 |
| 12 (stop) | ∞ | 0.15 | | | 10.16 |
| 13* | 14.641 | 5.00 | 1.55332 | 71.7 | 10.44 |
| 14* | −14.937 | 1.74 | | | 9.96 |
| 15 | 10.016 | 3.84 | 1.43700 | 95.1 | 8.47 |
| 16 | −12.705 | 0.15 | | | 7.06 |
| 17 | −26.402 | 0.40 | 1.80809 | 22.8 | 6.44 |
| 18 | 9.568 | 4.72 | | | 6.02 |
| 19 | −9.201 | 0.40 | 1.9165 | 31.6 | 8.19 |
| 20 | −160.878 | 0.15 | | | 9.24 |
| 21* | 11.615 | 4.77 | 1.85135 | 40.1 | 12.83 |
| 22* | −9.829 | 2.50 | | | 12.96 |
| 23 | ∞ | 2.00 | 1.51633 | 64.1 | |
| Image plane | ∞ | | | | |

| Aspherical surface data |
|---|

The second surface

K = −7.64314e+000
The 13-th surface

K = 8.04796e−001 A4 = −8.97366e−005 A6 = 2.06144e−006
A8 = −3.31948e−008 A10 = 1.62040e−009 A12 = 4.98431e−012
The 14-th surface K = −1.27388e+001 A4 = −3.10523e−004 A6 = 1.41862e−005
A8 = −3.12689e−007 A10 = 6.46163e−009
The 21-st surface K = 0.00000e+000 A4 = −3.15224e−004 A6 = 4.96099e−006
A8 = −5.06729e−008 A10 = 4.16957e−010 A12 = −2.12279e−013
The 22-nd surface K = 0.00000e+000 A4 = 4.45436e−004 A6 = −3.17615e−007
A8 = 4.81863e−008 A10 = −8.25212e−011

-continued

| Various kinds of data | |
|---|---|
| Entire-system focal length | 4.90 |
| Focal length of protection cover | −1803.6 |
| Focal length of lens portion | 4.82 |
| F number | 1.69 |
| Half angle of view (degree) | 48.30 |
| Image height | 5.5 |
| Lens total length | 68.30 |
| BF (in Air) | 5.71 |

| Each unit data | |
|---|---|
| Unit | Focal length |
| 1 | −1803.6 |
| 2 | 4.82 |

| Single lens data | |
|---|---|
| Lens | Focal length |
| 1 | −1803.6 |
| 2 | −16.38 |
| 3 | −13.35 |
| 4 | −23.35 |
| 5 | 12.04 |
| 6 | −40.84 |
| 7 | 14.22 |
| 8 | 13.51 |
| 9 | −8.65 |
| 10 | −10.66 |
| 11 | 6.97 |

[Numerical Value Data 2]

| Surface number | r | d | nd | vd | Effective diameter |
|---|---|---|---|---|---|
| 1* | 306.860 | 3.50 | 1.58306 | 30.2 | 38.08 |
| 2* | 967.971 | (variable) | | 33.78 | |
| 3 | 23.028 | 0.90 | 1.83481 | 42.7 | 22.06 |
| 4 | 9.154 | 5.98 | | | 16.22 |
| 5 | −60.859 | 0.70 | 1.72000 | 50.2 | 15.62 |
| 6 | 15.758 | 3.16 | | | 14.36 |
| 7 | 21.959 | 3.40 | 1.95906 | 17.5 | 14.29 |
| 8 | 52.183 | (variable) | | | 13.38 |
| 9 (stop) | ∞ | (variable) | | | 8.94 |
| 10* | 14.257 | 2.75 | 1.55332 | 71.7 | 9.81 |
| 11* | −24.080 | 0.17 | | | 10.19 |
| 12 | 25.873 | 4.50 | 1.43875 | 94.9 | 10.04 |
| 13 | −9.856 | 0.49 | | | 9.5 |
| 14 | 13.855 | 0.50 | 1.92286 | 18.9 | 7.39 |
| 15 | 6.769 | 1.31 | | | 6.76 |
| 16* | 11.246 | 3.80 | 1.85135 | 40.1 | 7.04 |
| 17 | −7.783 | 0.50 | 1.58144 | 40.8 | 6.78 |
| 18 | 8.901 | (variable) | | | 6.23 |
| 19 | ∞ | 2.00 | 1.51633 | 64.1 | |
| Image plane | ∞ | | | | |

Aspherical surface data

The first surface

K = 0.00000e+000 A4 = 1.05882e−005 A6 = 4.75350e−009
A8 = 3.57296e−011
The second surface K = 0.00000e+000 A4 = 1.46762e−005 A6 = −1.06016e−008
A8 = 1.39859e−010 A10 = −1.11284e−013
The 10-th surface K = 6.34467e−001 A4 = −5.52534e−004 A6 = −7.32538e−006
A8 = −1.11596e−007 A10 = −4.57436e−009
The 11-th surface K = −4.54256e+001 A4 = −5.01030e−004 A6 = 8.71896e−006
A8 = −4.30216e−007 A10 = 3.79479e−009
The 16-th surface K = 0.00000e+000 A4 = −2.16456e−004 A6 = −2.09482e−006
A8 = −9.22641e−008 A10 = 6.57477e−009

| Various kinds of data Zoom ratio = 2.30 | | | |
|---|---|---|---|
| | Wide angle | Intermediate | Telephoto |
| Entire-system focal length | 3.05 | 5.04 | 7.01 |
| Focal length of protection cover | 769.07 | 769.07 | 769.07 |
| Focal length of lens portion | 2.99 | 4.84 | 6.69 |
| F number | 1.27 | 1.51 | 1.75 |
| Half angle of view (degree) | 44.53 | 30.79 | 23.16 |
| Image height | 3.0 | 3.0 | 3.0 |
| Lens total length | 65.47 | 65.47 | 65.47 |
| BF (in Air) | 5.14 | 6.76 | 8.39 |
| d2 | 2.00 | 15.26 | 20.28 |
| d8 | 22.18 | 8.91 | 3.90 |
| d9 | 3.81 | 2.18 | 0.56 |
| d18 | 2.14 | 3.77 | 5.39 |
| d20 | 1.68 | 1.68 | 1.68 |

| Each unit data | |
|---|---|
| Unit | Focal length |
| 1 | 769.07 |
| 2 | −11.47 |
| 3 | 10.07 |

| Single lens data | |
|---|---|
| Lens | Focal length |
| 1 | 769.07 |
| 2 | −18.75 |
| 3 | −17.32 |
| 4 | 37.47 |
| 5 | 16.61 |
| 6 | 16.92 |
| 7 | −14.84 |
| 8 | 5.95 |
| 9 | −7.06 |

TABLE 1

| | | First embodiment | | Second embodiment | |
|---|---|---|---|---|---|
| tc | | 3.5 | | 3.5 | |
| $ASPsag_1$ | r1 | — | | r1 | 2.24 |
| | r2 | 1.82 | | r2 | 1.68 |
| fa | | 4.82 | | | 2.99 |
| fc | | −1803.6 | | | 769.07 |
| Ec | | 49.13 | | | 38.08 |
| $Eg_1$ | | 17.37 | | | 22.06 |
| $cr_1$ | | 50.0 | | | 306.86 |
| $cr_2$ | | 46.5 | | | 967.97 |
| $ASPsag_{0.5}$ | r1 | — | | r1 | 0.093 |
| | r2 | 0.150 | | r2 | 0.075 |
| ta | | 5.645 | | | 3.535 |

TABLE 2

| Conditional expression | | | First embodiment | Second embodiment |
|---|---|---|---|---|
| Conditional expression (1) | $|ASPsag_1/tc|$ | r1 | — | 0.64 |
| | | r2 | 0.52 | 0.48 |
| Conditional expression (2) | $|fa/fc|$ | | 0.0027 | 0.0039 |
| Conditional | $Ec/Eg_1$ | | 2.83 | 1.73 |

TABLE 2-continued

| Conditional expression | | First embodiment | Second embodiment |
|---|---|---|---|
| expression (3) | | | |
| Conditional expression (4) | tc/fa | — | 0.73 | 1.17 |
| Conditional expression (5) | $(cr_1 - cr_2)/(cr_1 + cr_2)$ | — | 0.036 | −0.519 |
| Conditional expression (6) | $|ASPsag_1/ASPsag_{0.5}|$ | r1 | — | 24.05 |
| | | r2 | 12.14 | 22.42 |
| Conditional expression (7) | tc/ta | | 0.62 | 0.99 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-235779, filed Dec. 5, 2016, which is hereby incorporated by reference herein in its entirety.

What is claimed is:

1. An optical system comprising a protection cover made of resin and a lens portion arranged in order from an object side to an image side,
wherein the protection cover includes an aspherical surface whose shape from an optical axis to a peripheral portion is continuously changed, and
wherein the following conditional expressions are satisfied:

$$0.05 < |sag_1/tc| < 5.00, \text{ and}$$

$$0.00 < |fa/fc| < 0.25,$$

where 2×ha represents an effective diameter of the aspherical surface, $sag_1$ represents a distance in a direction of the optical axis between the aspherical surface and a reference spherical surface of the aspherical surface at a position where the height from the optical axis is ha, tc represents a thickness of the protection cover on the optical axis, fc represents a focal length of the protection cover, and fa represents a focal length of the lens portion when the lens portion is a prime lens or a focal length of a zoom lens at a wide angle end when the lens portion is the zoom lens.

2. The optical system according to claim 1, wherein the following conditional expression is satisfied:

$$1.0 < Ec/Eg_1 < 5.0$$

where Ec represents an effective diameter of the protection cover, and $Eg_1$ represents the effective diameter of the lens surface closest to the object side of the lens portion.

3. The optical system according to claim 1, wherein the following conditional expression is satisfied:

$$0.4 < tc/fa < 4.0.$$

4. The optical system according to claim 1, wherein the following conditional expression is satisfied:

$$-2.0 < (cr_1 - cr_2)/(cr_1 + cr_2) < 1.5$$

where $cr_1$ and $cr_2$ represent paraxial curvature radiuses of an optical surface at an object side and an optical surface at an image side of the protection cover, respectively.

5. The optical system according to claim 1, wherein the following conditional expression is satisfied:

$$4.0 < |sag_1/sag_{0.5}| < 80.0$$

where $sag_{0.5}$ represents a distance in a direction of the optical axis between the aspherical surface and a reference spherical surface of the aspherical surface at a position where the height from the optical axis of the aspherical surface is ha/2.

6. An image pickup apparatus comprising:
the optical system according to claim 1; and
an image pickup element configured to receive an image formed by the optical system.

7. The image pickup apparatus according to claim 6, wherein the following conditional expression is satisfied:

$$0.2 < tc/ta < 1.5$$

where to represents an optical path length where a principal ray incident on a position farthest from the optical axis in the imaging plane of the image pickup element passes through the protection cover.

8. An optical system comprising a protection cover made of resin and a lens portion arranged in order from an object side to an image side,
wherein the protection cover includes an aspherical surface whose shape from an optical axis to a peripheral portion is continuously changed, and
wherein the following conditional expressions are satisfied:

$$0.05 < |sag_1/tc| < 5.00, \text{ and}$$

$$1.0 < Ec/Eg_1 < 5.0,$$

where 2×ha represents an effective diameter of the aspherical surface, $sag_1$ represents a distance in a direction of the optical axis between the aspherical surface and a reference spherical surface of the aspherical surface at a position where the height from the optical axis is ha, tc represents a thickness of the protection cover on the optical axis, Ec represents an effective diameter of the protection cover, and $Eg_1$ represents the effective diameter of the lens surface closest to the object side of the lens portion.

9. An optical system comprising a protection cover made of resin and a lens portion arranged in order from an object side to an image side,
wherein the protection cover includes an aspherical surface whose shape from an optical axis to a peripheral portion is continuously changed, and
wherein the following conditional expressions are satisfied:

$$0.05 < |sag_1/tc| < 5.00, \text{ and}$$

$$0.4 < tc/fa < 4.0,$$

where 2×ha represents an effective diameter of the aspherical surface, $sag_1$ represents a distance in a direction of the optical axis between the aspherical surface and a reference spherical surface of the aspherical surface at a position where the height from the optical axis is ha, tc represents a thickness of the protection cover on the optical axis, and fa represents a focal length of the lens portion when the lens portion is a prime lens or a focal length of a zoom lens at a wide angle end when the lens portion is the zoom lens.

* * * * *